UNITED STATES PATENT OFFICE.

NATHAN SULZBERGER, OF NEW YORK, N. Y.

PROCESS OF REGENERATING CATALYSTS.

1,199,032.   Specification of Letters Patent.   Patented Sept. 19, 1916.

No Drawing.   Application filed March 20, 1916. Serial No. 85,504.

*To all whom it may concern:*

Be it known that I, NATHAN SULZBERGER, a citizen of the United States, residing at New York, in the county of New York and State of New York, have invented certain new and useful Improvements in Processes of Regenerating Catalysts, of which the following is a specification.

This invention is a process of regenerating such catalysts as comprise in intimate association, with or without other components, a catalytic agent proper, such a nickel or certain active compounds thereof, and a supporting material or carrier, such as silica or a silicious substance, promoting the efficiency of such catalytic agent proper.

In my prior Patent No. 1,143,332, patented June 15, 1915, reissued July 18, 1916, as No. 14,167, I have described among others a catalyst containing active nickel and a silicious carrier. According to the said patent, the active nickel and the silicious carrier are formed simultaneously and in a single operation from a unitary chemical body, substance or salt. Specifically, as one of the catalysts described in said patent, nickel silicate is subjected to the reducing action of hydrogen or other suitable reducing agent, whereby there is produced an apparently homogeneous reduction product, in each individual particle of which the nickel-bearing and the silicious component exist in intimate association, and even, it is believed, in molecular association. A product thus prepared exhibits little or no magnetic properties, is usually black in color, and presents a uniform appearance under the microscope, the individual particles bearing some resemblance to a glass in which a metalliferous body is held in colloidal or solid solution. My regenerative method is applicable with especial advantage to catalysts of this character. Instead of silicates, other suitable salts or compounds of nickel may be reduced in like manner, the borates being particularly adapted for my present purposes. A relatively high temperature does not destroy the catalytic activity of the reduction product, but temperatures so high as to fuse or frit the particles together should be avoided.

It will be observed that in every case the reduction product comprises, in the most intimate association, an active metal-bearing portion or component, and an acid portion or component, the latter serving as a carrier and distributer for the former, and promoting the catalytic efficiency.

My novel regenerative process is dependent upon the above relation and is advantageously carried out as follows: When the activity of the catalyst has become lowered from any cause, it is separated from the oil or other substance in connection with which it may have been used, and residual traces of the latter are removed by extraction, calcination or other appropriate method. The catalyst is then treated with the minimum requisite proportion of caustic soda or potash solution, whereby the acid-component (silica, boric acid, or related compounds) is dissolved with formation of the corresponding alkali salt. This solution is separated from the residual nickel-bearing portion, and the latter is dissolved in the minimum requisite proportion of any suitable acid reagent, for example nitric acid. There thus results on the one hand a solution of an alkaline silicate, borate, etc.; and on the other hand, a solution of a nickel salt. These solutions are mixed, whereby nickel silicate, borate, etc., is precipitated. By washing the precipitate to free it from an excess of either reagent and from soluble salts, and reducing it by hydrogen or otherwise, the original catalyst is completely and substantially quantitatively regenerated. It will of course be understood that whenever the original catalyst was formed by reduction of a definitely constituted salt or compound, the two solutions produced as above will be obtained, theoretically at least, in the proportion necessary for the precipitation: such adjustment may however be made as may prove necessary to secure complete precipitation of the nickel or of the silica, or its equivalents, compensating loss either of silica or its equivalents, or of nickel or its equivalents, as may be required. An excess of one of the ingredients may however in many cases be used to advantage, which excess may be washed out from the formed precipitate, if so desired.

My invention is not limited to the initial treatment of such catalysts as are described herein and in my prior patent above referred to, inasmuch as the successive treatments with an alkaline solvent for silica and an acid solvent for nickel or other catalytic metal are applicable in any case where nickel or a compound thereof is distributed upon or associated with a silicious carrier. In such case the regeneration does not of course in every case yield the initial catalyst, but the regenerative process produces the improved catalyst as described and claimed in my prior patent.

It is to be clearly understood that my invention is not restricted to the regeneration of catalysts which are or may be used for the particular purpose of hydrogenating oils or fats, but is applicable generally to all catalysts comprising an acid-soluble, active metalliferous component and a silicious or analogous alkali-soluble carrier. For example, the catalyst may consist of or contain the reduction products derived from a silicate or analogous salt of copper or another element having catalytic properties for the particular reaction in connection with which the catalyst is to be used. Thus, such catalysts may contain titanium, uranium, etc.

The terms silicate, borate, etc., are used herein to designate the insoluble precipitate obtained by the interaction of a solution of nickel or other metallic salt with an alkali silicate, borate, or the like, irrespective of whether or not the precipitate is a salt or compound of definite and invariable chemical constitution.

The expression "active metalliferous component" is used in the claims to designate the metal-bearing component of the catalyzer, whether this consists of metallic nickel or other metal, or of a catalytically active oxid or other compound of such metal.

The expression "acid carrier" is used to designate the silicious or other component of the catalyst, which is associated with the active metalliferous component and which, on account of its acid characteristics, may be parted from such metalliferous component by alkaline solvents, as described above.

It is not to be inferred that the silicious or other acid carrier is in all cases inert as regards catalytic effect, inasmuch as it is known that silica, for instance, has a catalytic effect in certain reactions.

My invention includes the application of the herein-described regenerative process to catalysts comprising an active metalliferous component associated with an acid carrier, whether such catalyst is used alone, or in admixture with other materials, either catalytic or non-catalytic. For example, the process is directly applicable to such mixtures as have been described in my prior patent above referred to, of nickel silicate or its reduction products with small amounts of palladium or palladium compounds.

I claim:—

1. The process of regenerating a catalyst having an active metalliferous component associated with an acid carrier, which consists in dissolving the acid carrier in an alkali, dissolving the metalliferous component in an acid, combining the solutions thus obtained, and subjecting the resulting precipitate to a reducing action to render it catalytically active.

2. The process of regenerating a catalyst containing nickel associated with an acid carrier, which consists in dissolving the acid carrier in an alkali, dissolving the nickel in an acid, combining the solutions thus obtained, and subjecting the resulting precipitate to a reducing action to render it catalytically active.

3. The process of regenerating a catalyst containing nickel associated with silica, which consists in dissolving the silica in an alkali, dissolving the nickel in an acid, combining the solutions thus obtained, and subjecting the resulting nickel silicate to a reducing action to render it catalytically active.

4. In a process of regenerating a catalyst having an active metalliferous component associated with an acid carrier, the steps which consist in dissolving the metalliferous component in an acid reagent, precipitating the metal by a solution of a chemical compound of a substance capable of serving as an acid carrier, and rendering the precipitate catalytically active.

5. In a process of regenerating a catalyst containing nickel associated with an acid carrier, the steps which consist in dissolving the nickel in an acid reagent, precipitating the nickel by a solution of a chemical compound of a substance capable of serving as an acid carrier, and rendering the precipitate catalytically active.

6. In a process of regenerating a catalyst having an active metalliferous component associated with an acid carrier, the steps which consist in dissolving the metalliferous component in an acid reagent, precipitating the metal by a solution of a chemical compound of the said acid carrier, and rendering the precipitate catalytically active.

7. In a process of regenerating a catalyst containing nickel associated with an acid carrier, the steps which consist in dissolving the nickel in an acid reagent, precipitating it therefrom by a solution of a chemical compound of the said acid carrier, and rendering the precipitate catalytically active.

8. In a process of regenerating a catalyst containing nickel associated with silica, the steps which consist in dissolving the nickel in an acid reagent, precipitating it therefrom by a compound of silica, and rendering the precipitate catalytically active.

In testimony whereof I affix my signature in presence of two witnesses.

NATHAN SULZBERGER.

Witnesses:
O. LINNEMEYER,
EDWARD D. BOOTH.